Figures 1, 2:
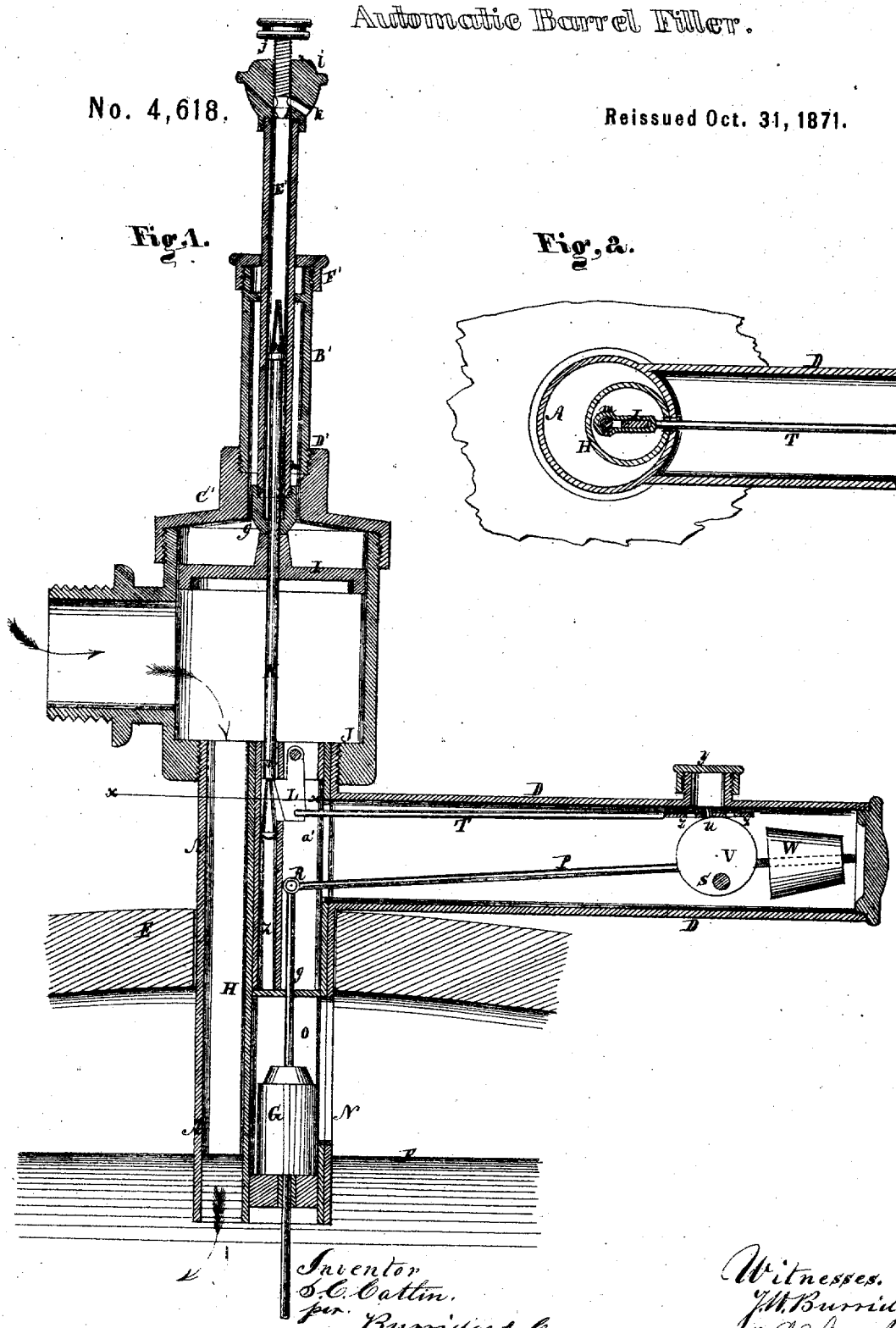

S. C. Callin.

Automatic Barrel Filler.

No. 4,618. Reissued Oct. 31, 1871.

Inventor
S. C. Callin.
per. Burridge & Co.
Attys
Cleveland, O.

Witnesses.
J. H. Burridge,
D. C. Humphrey

AM. PHOTO-LITHOGRAPHIC CO. N.Y. (OSBORNE'S PROCESS.)

UNITED STATES PATENT OFFICE.

SETH C. CATLIN, OF CLEVELAND, OHIO.

IMPROVEMENT IN AUTOMATIC BARREL-FILLERS.

Specification forming part of Letters Patent No. 99,159, dated January 25, 1870; reissue No. 4,618, dated October 31, 1871.

DIVISION B.

*To all whom it may concern:*

Be it known that I, SETH C. CATLIN, of Cleveland, in the county of Cuyahoga and State of Ohio, have invented a new and useful Improvement in Automatic Barrel-Fillers; and I do hereby declare that the following is a full, clear, and exact description thereof, which will enable others skilled in the art to make and use the same, reference being had to the accompanying drawing forming part of this specification.

This invention relates to a new and improved apparatus for filling barrels and other vessels with oil or other liquids; and consists in providing certain mechanical devices and arranging them in such a manner that the flow of oil or liquid into the barrel shall be automatically stopped when the barrel is filled or nearly filled. It also consists in a device combined therewith for drawing oils or liquids from the reservoir for testing or other purposes, as will be hereinafter more fully described.

In the accompanying drawing, Figure 1 represents a vertical section of the barrel-filler, showing the parts of which it is composed arranged in their proper positions. Fig. 2 is a horizontal section of Fig. 1 through the line *x x*, showing a top view of the mechanism for tripping the stop-valve.

Similar letters of reference indicate corresponding parts.

This apparatus consists of a main tube, A, the stop-valve chamber B, the induction-tube C connected therewith, and the branch-tube D inclosing the adjusting and tripping device, together with the float-lever, rods, and stop-valve, referred to hereafter. The barrel-filler is represented as when in use. E represents the barrel, and F the surface of the fluid in the barrel. G is a float, which operates in the tube H, which tube is placed within the tube A, as seen in the drawing. The course of the liquid from the reservoir or tank into the barrel is indicated by the arrows. The flow of the liquid into the barrel is stopped automatically by the drop-valve I onto the seat J. This valve is attached to the rod K, and is supported on the hook L by means of the shoulder *m*. N is an aperture within the barrel, through the tubes A and H, into the float-chamber O. The float is made to act upon the hook L and cause the valve I to drop by means of the lever P, with which the float-rod *q* is connected at the point R. The fulcrum of the lever-rod P is at S. T is a rod which connects the hook L with the lever P at the point U. The point U may be the end of an arm from the lever P. In this example of my invention is a pin in the periphery of a disk, V, through which the lever passes. W is a movable weight on the end of the lever P for properly balancing the float. It will be seen that the connecting-rod T is adjustable on the pin U by means of the holes *x*, and that the cap *y* covers an orifice in the tube D, through which the adjustment is made. As the apparatus is shown in the drawing, the liquid in the barrel will continue to rise and the float will remain stationary in its chamber O until the liquid flows into the float-chamber through the aperture M and buoys up the float. When this takes place the long end of the lever will be raised, which will throw the rod T to the right and draw the hook L from the shoulder *m*, and valve I will drop and shut off the flow of the liquid into the barrel. The quantity of liquid discharged into the barrel depends upon the position or height of the float, and this position is varied by raising or lowering the float on its own rod. The holes *x* in the connecting-rod T are for fixing the proper position of the rod. By means of this arrangement the barrel may be filled to any desired height. A gallon (more or less) may be left out of the barrel, as may be desired. At each adjustment the float will be properly balanced by means of the movable weight W, so that the exact moment for tripping the valve and stopping the flow may be insured. The valve-rod K drops into the tube *z*. The tripping-hook L and its point of connection with the rod T, as well as the joint R, is contained in the tube *a'*, immediately above the float-chamber O. This tube *a'* is closed at the top, so as to exclude the liquid. B' is a tube, which is connected to the cap C' of the valve-chamber B by a screw-joint, as seen at D'. E' is a tube within B', which is kept in position by means of the cap F' and the hollow conical foot-piece *g* on its lower end. The valve-rod K passes through this conical end and into the tube E', as seen in the drawing. *h* is an orifice in the tube E', which admits liquid from the chamber B. *i* is a cap on the tube E′. *j* is a screw-valve on this cap; and *k* is an orifice in the cap, through which liquid from the tube F′ may be discharged when the screw-valve is raised. This arrangement is designed for filling vials with the liquid, for testing or other purposes. This is done when the valve is either up or down, so that the liquid can flow freely from the valve-chamber B into the outer tube B′. The inner tube E′ is allowed to play freely through the cap F′, and the valve I is raised by means of this vertical movement, so that the shoulder M on the valve-rod is brought above the tripping-hook L. *n* is a collar on the valve-rod K, by which the valve and rod are supported on the bottom of the hollow conical end *g* of the tube E′. When the tripping-hook L has caught the shoulder *m* so that the valve is supported thereby, the tube E′ is forced down to the position seen in the drawing.

The advantages of this apparatus for filling barrels or other similar vessels are many, and must be obvious to all. It is perfectly sure in its operation and stops the flow at the desired point of time, filling the barrel entirely or leaving it unfilled to any desired degree. When once adjusted it is perfectly self-acting, requiring no attention until it is to be transferred to another barrel; consequently a single attendant may attend to a number of the fillers, keeping them all in operation at the same time, thus greatly facilitating the operation of transferring liquid from a tank or reservoir to other vessels.

Having thus described my invention, I claim as new and desire to secure by Letters Patent—

The float G and float-chamber O and discharging-tube A, arranged in such correlation to each other that the said chamber and float are within said discharging-tube and extending above the outlet of the same, substantially as described, and for the purpose set forth.

SETH C. CATLIN.

Witnesses:
W. H. BURRIDGE,
N. W. TAYLOR.

(176)